United States Patent [19]
Rykowski et al.

[11] Patent Number: 5,706,376
[45] Date of Patent: Jan. 6, 1998

[54] MULTIPORT ILLUMINATOR FOR MACROFIBERS

[75] Inventors: Ronald F. Rykowski, Woodinville, Wash.; Andrew P. Riser, Ramona, Calif.; John F. Forkner, Laguna Beach, Calif.; Stephen S. Wilson, San Juan Capistrano, Calif.

[73] Assignee: Remote Source Lighting International, San Juan Capistrano, Calif.

[21] Appl. No.: 459,613

[22] Filed: Jun. 2, 1995

[51] Int. Cl.⁶ .................................. G02B 6/26
[52] U.S. Cl. .................. 385/31; 385/33; 385/47; 385/901
[58] Field of Search .................. 385/31, 33, 47, 385/901, 24; 362/32

[56] References Cited

U.S. PATENT DOCUMENTS

| | | | |
|---|---|---|---|
| 4,050,784 | 9/1977 | Kobayashi | 385/34 X |
| 4,389,698 | 6/1983 | Cibie | 362/32 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,887,190 | 12/1989 | Sadamune et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport et al. | 385/32 |
| 5,259,056 | 11/1993 | Davenport et al. | 385/115 |
| 5,367,590 | 11/1994 | Davenport et al. | 385/901 X |
| 5,377,287 | 12/1994 | Lee et al. | 385/31 |
| 5,396,571 | 3/1995 | Saadatmanesh et al. | 385/33 |

FOREIGN PATENT DOCUMENTS

| | | | |
|---|---|---|---|
| 2651283 | 5/1978 | Germany | 362/32 X |
| 63-291012 | 11/1988 | Japan | 385/33 |
| 6-174963 | 6/1994 | Japan | 385/24 |
| 2098311 | 11/1982 | United Kingdom | 385/901 X |

*Primary Examiner*—Rodney B. Bovernick
*Assistant Examiner*—Yisun Song
*Attorney, Agent, or Firm*—Donald E. Stout

[57] ABSTRACT

The inventive system, which is used in transmitting illumination from a central source to a variety of remote locations, efficiently couples the light originating from an arc lamp, or similar source, into a multiplicity of flexible macroscopic fibers. The combination of the several elements of the inventive system results in a very efficient transfer of the energy of the light source to the fibers. The system also provides a very flexible mechanical means for distributing the energy to the fibers and to the remote locations at which the light is used.

36 Claims, 3 Drawing Sheets

MULTIPORT ILLUMINATOR FOR MACRO-FIBERS

This application is related to application Ser. No. 08/374,163, filed on Jan. 17, 1995 now U.S. Pat. No. 5,559,911 and entitled *Optical Coupler*, which is commonly assigned, and is herein expressly incorporated by reference. The application is also related to application Ser. No. 08/271,368, filed on Jul. 6, 1994 now U.S. Pat. No. 5,467,207 and entitled LCD *Projection System*, which is also expressly incorporated herein by reference.

BACKGROUND OF THE INVENTION

Large diameter fiber optics, often referred to as "flexible light pipes", are well known in the art, and typically comprise a single, solid core fiber which is surrounded by a cladding layer and a sheath or shielding layer. The core is the portion of a light pipe which transmits light, and typically has a diameter of about 2 to 12 min. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter optical fibers, which are typically used to transmit information in relatively complex control systems, these large diameter "light pipes" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), or jail cells. They are particularly advantageous in that only a single centralized illumination system must be maintained, rather than a plurality of individual lights.

There are problems, however, in implementing state of the art light pipe illumination systems became of the difficulty of illuminating a plurality of light pipes from a single illumination source, as is discussed in related application Ser. No. 08/374,163 now U.S. Pat. No. 5,559,911. In order to maximize efficiency, the optical fibers must be bundled as closely as possible, to ensure the maximum ratio of core area (the part of each light pipe which actually transmits light) to total area. However, bundling the large diameter light pipes together in order to illuminate them from the single illumination source is difficult to do efficiently. Each of the individual light pipes are round and thus have a great deal of space between them due to the cladding and shielding layers. To obtain maximum efficiency, it is desirable to illuminate only the core of each of the bundled optical fibers, but this is impossible using state of the art bundling techniques. Necessarily, if the light from the source of illumination is spread across the army of optical fibers, it will illuminate not only the cores of the optical fibers, but also the cladding layers and the shielding layers. Furthermore, the voids between the optical fibers, which are inevitable because of the fibers' round dimensions, also are impacted by the light from the illumination source. All of the light falling upon any element other than the cores is wasted, and becomes an efficiency loss, since it will not be transmitted by the fibers. Additionally, packing the fibers so closely together creates problems such as mechanical difficulties in configuring and accommodating the illumination system and difficulties encountered in attempting to replace one of the individual bundled fibers. This design also typically results in color variation between fibers unless techniques are specifically employed to prevent this problem.

One prior art solution to this problem has been to eliminate the sheathing and cladding layers about each optical fiber, in order to reduce the area across the bundled array of fibers which does not transmit light. However, there is still a packing factor problem because the optical fibers are round, and there are other physical disadvantages in eluminating those layers. Thus, this solution is unsatisfactory for most applications.

SUMMARY OF THE INVENTION

This invention efficiently couples the light originating from an arc lamp, or similar source, into a multiplicity of flexible macroscopic fibers. Such a system is to be used in transmitting illumination from a central source to a variety of remote locations. The combination of the several elements of the inventive system results in a very efficient transfer of the energy of the light source to the fibers. The system also provides a very flexible mechanical means for distributing the energy to the fibers and to the remote locations at which the light is used.

The invention, together with additional features and advantages thereof may best be understood by reference to the following description taken in conjunction with the accompanying illustrative drawings.

DESCRIPTION OF THE PREFERRED EMBODIMENT

Figure 1:
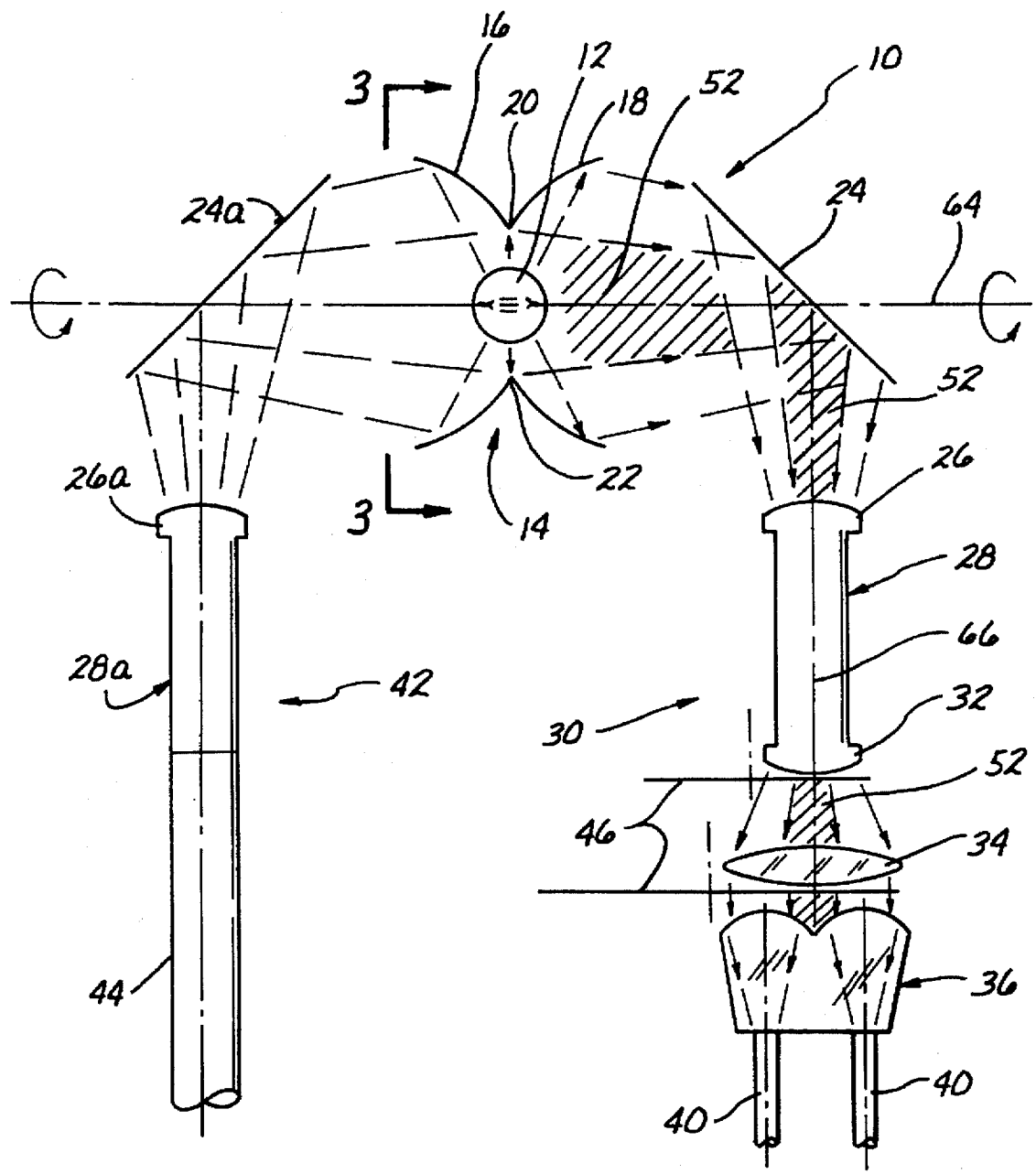
FIG. 1 is a schematic view of a preferred embodiment of the inventive optical system.

Referring now more particularly to the drawing, an optical system 10 is illustrated which includes a compact light source 12, which may comprise an arc lamp or similar source. The light source 12 is placed at the focus of a dual curved reflector 14, which comprises two reflector portions 16 and 18 which are disposed in a back-to-back fashion. In each reflector portion 16, 18, the center or vertex region of the reflector has been removed, as illustrated, and the two reflector portions are joined at intersection points 20 and 22.

Light emitted from the light source 12 is reflected by the dual reflector 14, as illustrated by the lines of incidence shown in FIG. 1, in two opposing directions, and is then directed through an angle of approximately 90 degrees (or any other desired angle) by each of two flat reflectors or fold mirrors 24 and 24a, respectively. Then, each focussed beam of light impinges on a lens end 26, 26a of a circular light pipe 28, 28a. Each of the two circular light pipes 28, 28a is comprised of a transparent material, such as glass or clear plastic, and is adapted to integrate the light beam by means of multiple reflections within the light pipe.

Figure 4:
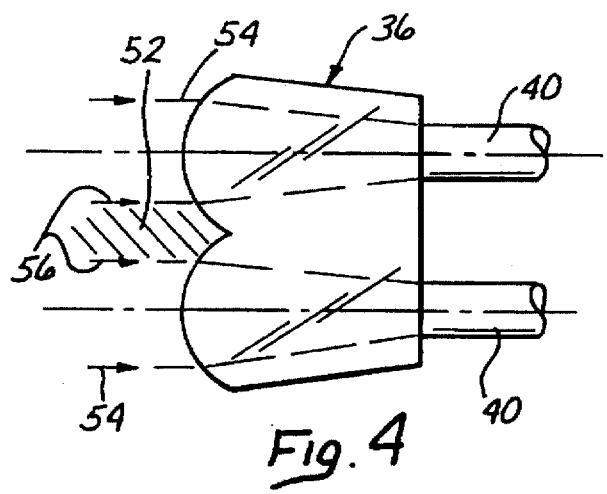
FIG. 4 is schematic side view illustrating the multi-sector lens which forms a part of the optical system shown in FIG. 1.
Figure 5:
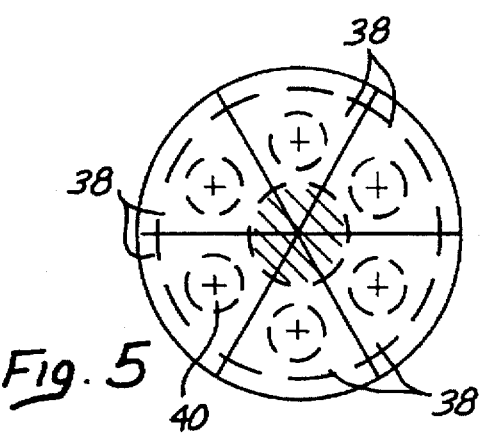
FIG. 5 is an end view of the multi-sector lens shown in FIG. 4.
Figure 6:
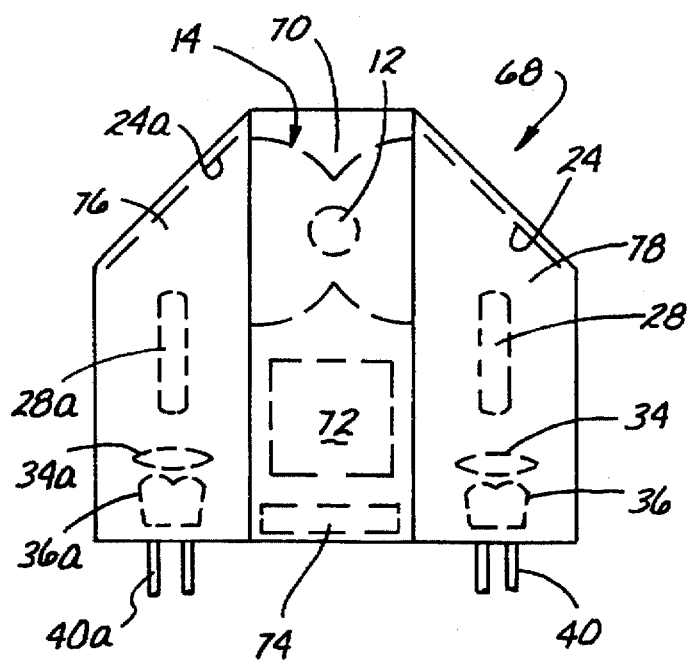
FIG. 6 is a schematic top view of an inventive fiber illumination unit, illustrating a homing containing the system elements shown in FIG. 1.

On the right side of the system, or right channel 30, as illustrated, the light beam emerges from the light pipe 28 at an exit lens face 32. The diverging from the light pipe 28 is then collimated by means of a collimating lens 34. Following this, the collimated beam is split into a number of separate focussed beams by means of a multi-sectored lens 36 (FIGS. 1, 4, and 5). Each of the lens sectors 38 (FIG. 5) focusses onto the core of a corresponding output fiber 40.

The optical system for the left beam focussed by the dual reflector 14 through the left channel 42 can be essentially the same as that described with respect to the right channel 30, or some different features may be incorporated into the left channel. For example, the right channel 30 might have a collimating lens and sector lens accommodating ten output fibers while the left channel might only couple to a single large fiber or multi-fiber bundle 44.

Another useful feature of the invention, as illustrated in FIG. 1, is to incorporate a rotating color wheel 46 at the exit of the light pipe 28 or, alternatively, in front of the sector lens 36. Both locations are shown in the figure, though typically only one or the other of the color wheels 46 would actually be employed at one time. With the color wheel 46 at the light pipe exit, the color of the light to all of the fibers is the same and changes simultaneously as the wheel rotates. With the wheel near the entrance to the sector lens, the colors to each fiber are different and can change at different rates depending on the pattern on the wheel. These various color controls are useful in pool lighting, signs and other applications.

Figure 2:
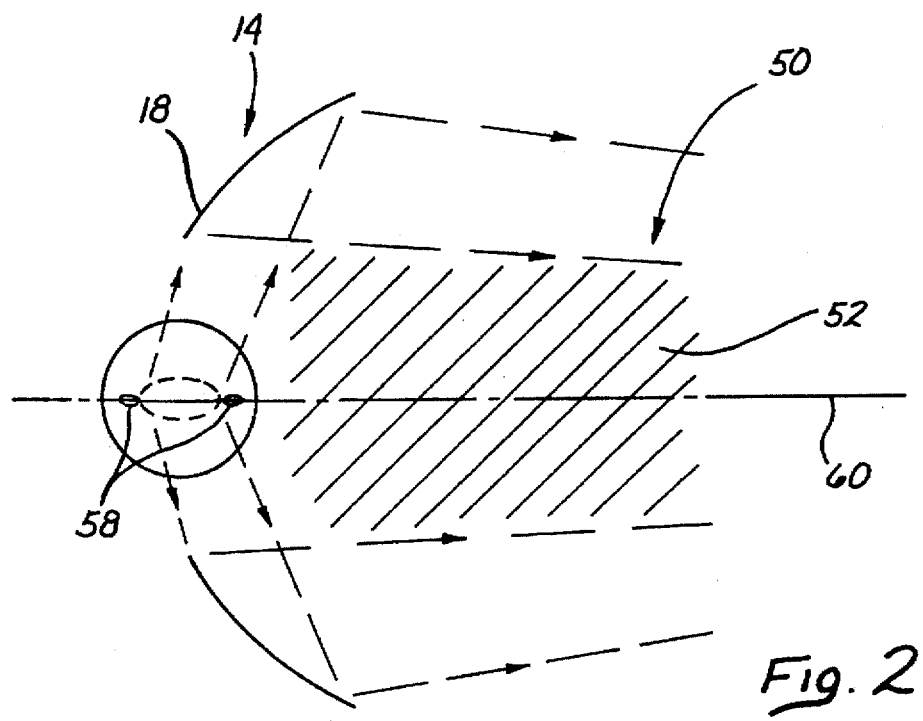
FIG. 2 is an enlarged schematic view of the lamp and right portion of the dual reflector illustrated in FIG. 1.
Figure 3:
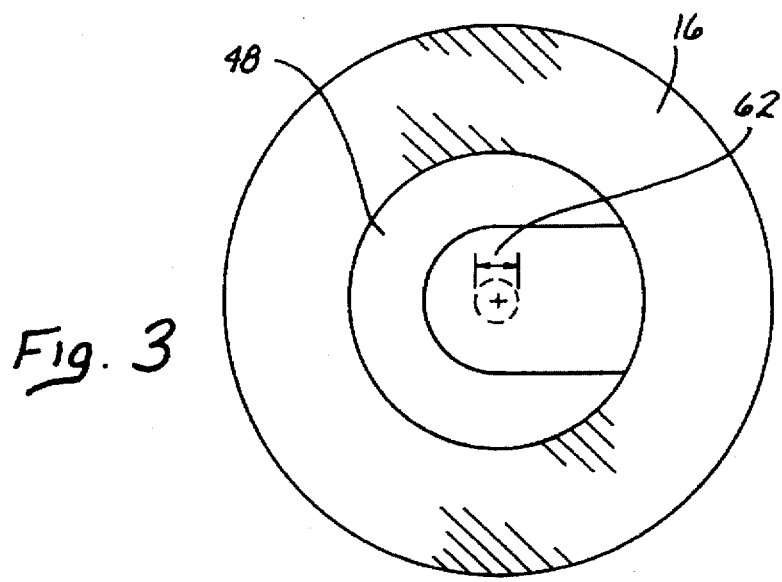
FIG. 3 is an end view of the dual reflector, taken along lines 3—3 in FIG. 1.
Figure 8:
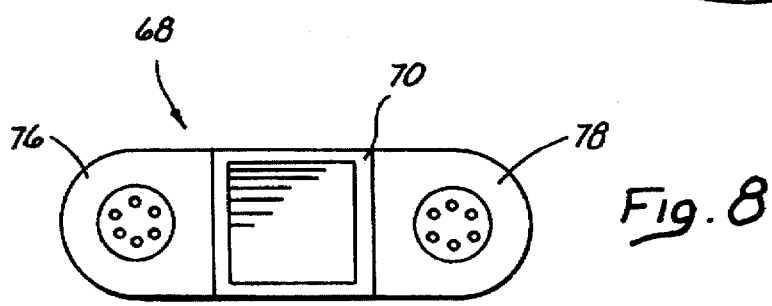
FIG. 8 is a schematic front view of the unit illustrated in FIGS. 6 and 7.

The high efficiency of this illumination system derives from the special design of a number of its elements working singly and in combination. The lamp 12 is preferably selected to have small arc dimensions so that it will couple into fibers of relatively small diameter (preferably 3 mm to 10 mm). The reflector 14 consists of two axially symmetrical curved halves or portions 16 and 18, with the lamp centered at their matching plane. This arrangement makes use of the very efficient collection properties of the low magnification section of the ellipsoidal (or near ellipsoidal) reflector shape. The large hole 48 in the center of each reflector-half (FIG. 3) results in a focussed light beam with a ring-shaped cross section. The light entering the hole in the reflector is not lost but passes into the opposite reflector-half and is focussed into the second focussed beam. This reflector arrangement efficiently generates a ring cross-section beam which is very useful in reducing the radial aperture required of each of the sector lenses 38. FIG. 2 shows a section through the right portion 18 of the dual reflector 14 indicating how the ring-shaped beam 50 is generated. The ring-shaped beam 50, wherein the darkened center portion 52 is represented by cross-hatching, is preserved through the light pipe 28 and through the collimating lens 34 (see FIG. 1). As shown best in FIG. 4, the ring-shaped beam impinges on the sector lens as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter fibers, thus unexpectedly increasing the efficiency of the system. The minimum fiber diameter is controlled by the need to match the output beam divergence to the numerical aperture of the fiber.

Another important feature of the invention is the orientation of the arc lamp 12. As illustrated particularly in FIG. 2, the lamp is shown at the focal point of the dual reflector 14. The long dimension of the arc discharge of the lamp 12, as defined by the position of the electrodes 58, is oriented so as to be substantially parallel and coincident with the reflector symmetry axis 60. The efficiency of transmission of the optical system is greatly influenced by the arc orientation with respect to the reflector because of the high length to diameter ratio (typically about 5x) of the arc. By aligning the lamp as described, the small dimension 62 of the arc (FIG. 3) becomes the controlling parameter in defining the minimum permissible output fiber diameter for efficient coupling. Small output fiber diameter is usually desired in most applications. Designing for minimum output fiber diameter permits larger fibers to also be coupled efficiently, provided that the criterion of matching output beam divergence to fiber numerical aperture is met.

Although six equal lens sectors 38 are illustrated in FIG. 5, the sector lens 36 can have as few as two and up to about twelve sectors. Also, the sectors need not be equal in area, since in some applications it may be desirable to deliver different amounts of light to different locations. The sector lens as a means of splitting the incident beam has a major advantage over currently used bundled fibers in that the sector lens array separates the fibers from each other (FIGS. 4 and 5), thereby permitting easy installation and removal of individual fibers.

The fold reflector 24, 24a may serve a multiple function of folding mirror and heat rejecting mirror. As a folding mirror, it also provides the ability of rotating the entire output optical system around a mechanical axis 64, as best shown in FIG. 1. This feature is very useful in allowing great flexibility in positioning the direction in which the fibers emerge from the unit. Independent rotation of the fold mirrors 24, 24a on either side of the lamp gives additional flexibility of output fiber location.

As described above, the circular light pipe 28 (as well as light pipe 28a) is used to integrate the angular distribution of the light around the pipe axis 66. This is advantageous since it allows the light output of each fiber to be identical (which is usually desired), because the angular light distribution from the lamp is not generally uniform. Additionally, the metal-halide type of arc lamp which is preferably used typically has some color differences in the angular distribution which also needs to be integrated out in order to avoid undesirable color differences in output between fibers. Field lenses 26 and 32 (FIG. 1) are preferably employed on the light pipe ends to constrain the light inside the pipe so that it is totally reflected internally. Mechanically, the field lens portions 26 and 32 of the light pipe are larger in diameter than the pipe section itself in order to provide a loss-free means of mounting the light pipe. Anything touching the light pipe surface will bleed off some of the internally reflected light unless the pipe is clad, which is a disadvantageous approach since it reduces its numerical aperture and increases its cost.

The collimating lens 34 accomplishes the initial focussing of the light beam onto the output fibers 40. Thus, the collimating lens in conjunction with each individual lens sector 38 comprises a relay lens system that roughly images the output end of the light pipe onto the fiber port. The lens sectors may have aspheric shapes to reduce aberrations and improve efficiency, and are preferably given a thickness such that the output beam is focussed on the rear surface of the lens sector. This allows the soft core of the usual type of fiber to "wet" the lens surface, thereby reducing reflection losses at this interface.

A complete fiber illumination unit 68 having a modular dual-port construction, is illustrated schematically in FIGS.

Figure 7:
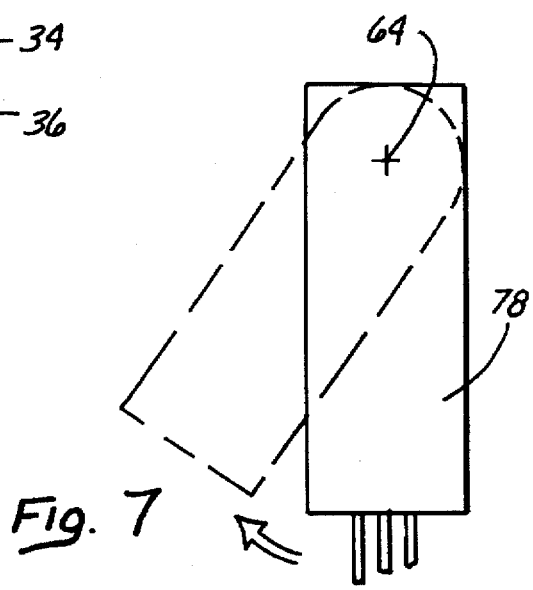
FIG. 7 is a schematic side view of the unit illustrated in FIG. 6.

6 through 8. The center module 70 of the unit contains the light source 12 and its dual reflector 14, together with a power supply 72, cooling fan 74, and all other associated electrical wiring, etc. Two side modules 76 and 78 preferably contain the fold mirrors 24 and 24a, the light pipes 28 and 28a, and the collimating lens 34 and 34a and sector lens assemblies 36 and 36a that feed into the fibers 40 and 40a. As discussed in connection with FIG. 1, although the two modules 76 and 78 are substantially identical, there is no requirement that they be so. Having different sector lenses on either side allows coupling to a different number of fibers on the two sides. Advantageously, the side modules 76 and 78 do not contain any electrical wiring and therefore can be detached easily from the central source module 70, using ordinary mechanical fasteners. The side modules can be rotated about the mechanical axis 64, as discussed in FIG. 1 and shown in FIG. 7, in order to allow convenient placement of the fiber output ports this feature permits great flexibility for lighting installations with tight space restraints, in building utility closets and the like.

Although exemplary embodiments of the invention have been shown and described, many changes, modifications, and substitutions may be made by one having ordinary skill in the art without necessarily departing from the spirit and scope of this invention.

What is claimed is:

1. An optical fiber illumination system comprising a fiber illumination unit having a center module and at least one side module, wherein the center module containing a light source and a dual reflector and the at least one side module containing a light pipe, a multi-sectored lens, and at least one output fiber, said at least one side module being removably attachable to said center module.

2. The optical fiber illumination system as recited in claim 1, wherein said at least one side module contains no electrical wiring.

3. The optical fiber illumination system as recited in claim 1, wherein the side module is rotatable with respect to the center module.

4. The optical fiber illumination system as recited in claim 1, wherein there are two side modules containing substantially identical optical system components.

5. The optical fiber illumination system as recited in claim 1, wherein there are two side modules containing substantially different optical system components.

6. The optical fiber illumination system as recited in claim 1, wherein said at least one side module comprises a plurality of side modules which are interchangeable with one another in order to vary the illumination characteristics of said system.

7. The optical fiber illumination system as recited in claim 1, wherein said system is portable.

8. An optical fiber illumination system comprising a fiber illumination unit having a center module and at least one side module, wherein the center module comprises a housing which contains a light source, and the at least one side module comprises a housing which contains optical components for processing light emitted from said light source and directing said light to an input end of at least one optical fiber, said side module being removably attachable to said center module.

9. The optical fiber illumination system as recited in claim 8, wherein the light emitted from said light source is incoherent visible light.

10. The optical fiber illumination system as recited in claim 8, wherein said at least one side module contains no electrical wiring, and is therefore readily detachable from said center module.

11. The optical fiber illumination system as recited in claim 8, wherein the side module is rotatable with respect to the center module.

12. The optical fiber illumination system as recited in claim 8, wherein there are two side modules containing substantially identical optical system components.

13. The optical fiber illumination system as recited in claim 8, wherein there are two side modules containing substantially different optical system components.

14. The optical fiber illumination system as recited in claim 8, wherein the optical components in the at least one side module comprise a multi-sectored lens, the number of output optical fibers being in equal in number to the number of sectors in said lens, and each of said lens sectors being arranged to direct light from said light source to an input end of a corresponding one of said output optical fibers.

15. The optical fiber illumination system as recited in claim 14, wherein the optical components further comprise a color wheel disposed in front of said multi-sectored lens.

16. The optical fiber illumination system as recited in claim 14, wherein said optical components further comprise a light pipe disposed between said light source and said multi-sectored lens.

17. The optical fiber illumination system as recited in claim 16, wherein said optical components further comprise a collimating lens disposed between said light pipe and said multi-sectored lens.

18. The optical fiber illumination system as recited in claim 17, and further comprising a color wheel disposed between said collimating lens and said multi-sectored lens.

19. The optical fiber illumination system as recited in claim 17, and further comprising a color wheel disposed between said light pipe and said collimating lens.

20. The optical fiber illumination system as recited in claim 14, wherein the optical components further comprise a fold mirror disposed at an end of said side module proximal to said light source, for redirecting the light emitted from said light source toward said multi-sectored lens.

21. The optical fiber illumination system as recited in claim 8, wherein the optical components in said at least one side module comprise a light pipe which is adapted to transmit light directly to an input end of a single output optical fiber.

22. The optical fiber illumination system as recited in claim 8, wherein the center module further includes a dual reflector having an axis of symmetry and the light source is a lamp of the arc discharge type, the long dimension of the arc discharge of the lamp being oriented so as to be substantially parallel and coincident with the reflector symmetry axis.

23. The optical fiber illumination system as recited in claim 8, wherein the center module further comprises a cooling fan and a power supply.

24. The optical fiber illumination system as recited in claim 14, wherein the lens sectors of said multi-sectored lens are aspheric.

25. An optical fiber illumination system, comprising:
a light source;
a dual reflector having an axis of symmetry;
a first channel having a light pipe and a multi-sectored lens, a first end of the light pipe being arranged to receive light emitted from said light source, and a second end of the light pipe being arranged to transmit light to said multi-sectored lens; and
a plurality of output optical fibers corresponding in number to the number of segments of said multi-sectored lens, each of said output optical fibers having an input end and an output end, wherein each of said lens sectors are arranged to transmit light to the input end of a corresponding one of said output optical fibers.

26. The optical fiber illumination system as recited in claim 25, wherein the light emitted from said light source is incoherent visible light.

27. The optical fiber illumination system as recited in claim 25, and further comprising a second channel having a light pipe, a first end of the light pipe being arranged to receive light emitted from said light source, and a second end of the light pipe being arranged to transmit light to a single optical fiber.

28. The optical fiber illumination system as recited in claim 25, wherein the first channel further comprises a color wheel disposed between the light pipe and the multi-sectored lens.

29. The optical fiber illumination system as recited in claim 28, wherein the first channel further comprises a collimating lens disposed between the light pipe and the multi-sectored lens.

30. The optical fiber illumination system as recited in claim 29, wherein the first channel further comprises a color wheel disposed between the light pipe and the collimating lens.

31. The optical fiber illumination system as recited in claim 29, wherein the first channel further comprises a color wheel disposed between the collimating lens and the multi-sectored lens.

32. The optical fiber illumination system as recited in claim 27, wherein each of the first and second channels comprises a fold mirror disposed between the light source and the light pipe.

33. The optical fiber illumination system as recited in claim 25, wherein the light source is a lamp of the arc discharge type, the long dimension of the arc discharge of the lamp being oriented so as to be substantially parallel and coincident with the reflector symmetry axis.

34. The optical fiber illumination system as recited in claim 25, wherein the lens sectors of the multi-sectored lens are aspheric.

35. The optical fiber illumination system as recited in claim 25, wherein the sectors of the multi-sectored lens are unequal in cross-sectional area.

36. The optical fiber illumination system as recited in claim 25, wherein the optical fiber illumination system has a modular dual-port construction, and the first channel is readily mechanically separable from the portion containing the light source.

* * * * *